US012667060B2

(12) United States Patent
Thompson et al.

(10) Patent No.: US 12,667,060 B2
(45) Date of Patent: *Jun. 30, 2026

(54) REPELLENT DELIVERY DEVICE WITH GLYCERIN SOAP BODY AND RELATED METHODS

(71) Applicant: Radical Ag Tech, Inc., Dundee, FL (US)

(72) Inventors: Scott K. Thompson, Winter Haven, FL (US); Thomas A. Thayer, Jr., Winter Haven, FL (US); James Murray Shinn, Dundee, FL (US)

(73) Assignee: RADICAL AG TECH, INC., Dundee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,246

(22) Filed: Aug. 27, 2024

(65) Prior Publication Data

US 2024/0415074 A1     Dec. 19, 2024

Related U.S. Application Data

(63) Continuation of application No. 17/173,462, filed on Feb. 11, 2021, now Pat. No. 12,114,610, which is a
(Continued)

(51) Int. Cl.
*A01G 13/10* (2006.01)
*A01M 1/20* (2006.01)
(Continued)

(52) U.S. Cl.
CPC ......... *A01G 13/105* (2013.01); *A01M 1/2005* (2013.01); *A01M 29/12* (2013.01); *F16M 13/005* (2013.01)

(58) Field of Classification Search
CPC . A01G 13/105; A01M 1/2005; A01M 1/2027; A01M 29/12
See application file for complete search history.

(56) References Cited

U.S. PATENT DOCUMENTS

| 374,011 | A | 11/1887 | Smith et al. |
| 1,814,573 | A | 7/1931 | Shaffer |
| | | (Continued) | |

FOREIGN PATENT DOCUMENTS

| CN | 104982402 | 10/2015 |
| JP | 05-076282 | 10/1993 |
| JP | H11269005 | 10/1999 |

OTHER PUBLICATIONS

GloryBee, Tips For Removing Soap From Plastic Molds, Sep. 20, 2016 (Year: 2016) ***See U.S. Appl. No. 17/173,462.
(Continued)

*Primary Examiner* — Joshua J Michener
*Assistant Examiner* — Nicole Paige Maccrate
(74) *Attorney, Agent, or Firm* — Allen, Dyer, Doppelt + Gilchrist, PA

(57) ABSTRACT

A plant repellent delivery device assembly may include a plant with a root ball, and an integrally molded hygroscopic body having a hygroscopic glycerin soap base material, and an insecticide. The integrally molded hygroscopic body may have an external surface directly exposed to an external environment and configured to condense ambient moisture directly thereon. The plant repellent delivery device assembly may include a support structure coupled between the integrally molded hygroscopic body and a trunk of the plant, the support structure extending within the integrally molded hygroscopic body. The integrally molded hygroscopic body may be configured to release the insecticide into the root ball of the plant using the ambient moisture.

20 Claims, 7 Drawing Sheets

Related U.S. Application Data continuation-in-part of application No. PCT/US2019/046668, filed on Aug. 15, 2019.

(60) Provisional application No. 62/719,229, filed on Aug. 17, 2018.

(51) Int. Cl.
   *A01M 29/12*      (2011.01)
   *F16M 13/00*      (2006.01)

(56)                References Cited

U.S. PATENT DOCUMENTS

| | | | | |
|---|---|---|---|---|
| 2,527,077 | A * | 10/1950 | Preston | C11D 10/042 |
| | | | | 510/448 |
| 3,130,519 | A | 4/1964 | Mauget | |
| 3,341,457 | A | 9/1967 | Schmidt | |
| 3,519,568 | A | 7/1970 | Needleman | |
| 4,651,468 | A | 3/1987 | Martinez et al. | |
| 4,800,676 | A | 1/1989 | Lockwood, Sr. | |
| 4,913,319 | A | 4/1990 | Root | |
| 5,101,744 | A | 4/1992 | Nolan | |
| 5,434,190 | A | 7/1995 | Steltenkamp | |
| 5,711,955 | A | 1/1998 | Karg | |
| 6,230,435 | B1 | 5/2001 | Carman | |
| 8,424,778 | B2 | 4/2013 | Mount | |
| 8,647,684 | B2 | 2/2014 | Baube | |
| 12,114,610 | B2 * | 10/2024 | Thompson | A01N 25/34 |
| 2002/0173436 | A1 | 11/2002 | Sonnenberg et al. | |
| 2005/0268548 | A1 | 12/2005 | Lovette et al. | |
| 2006/0201063 | A1 | 9/2006 | Huon | |
| 2009/0246241 | A1 | 10/2009 | Pitt | |
| 2011/0073671 | A1 * | 3/2011 | Mount | A01M 1/2055 |
| | | | | 239/44 |
| 2013/0287830 | A1 | 10/2013 | Aulisa et al. | |
| 2014/0208645 | A1 | 7/2014 | Guggenheim et al. | |
| 2016/0022858 | A1 | 1/2016 | D'Amico | |
| 2016/0249538 | A1 * | 9/2016 | Lee | A01M 1/2011 |
| | | | | 43/131 |
| 2017/0086396 | A1 | 3/2017 | Burch | |

OTHER PUBLICATIONS

"Grandma's Don't Bug Me Bar" Retrieved from internet Aug. 15, 2023; pp. 8 https://www.amazon.com/Grandmas-Dont-Bug-Soap-Bar/dp/B008BIM8KI/ref=asc_df_B008BIM8KI?tag=bngsmtphsnus-20&linkCode=df0&hvadid=80608063553907&hvnetw=s&hvqmt=e&hvbmt=be&hvdev=c&hvlocint=&hvlocphy=&hvtargid=pla-4584207591009705&psc=1 *** See U.S. Appl. No. 17/173,462.
Susie J, Hot pepper, toilet paper tubes and Irish Spring, May 21, 2008, SusieJ.com (https://susiej.com/hot-pepper-toilet-paper-tubes-and-irish-spring/) (Year: 2002).

* cited by examiner

410

412

REPELLENT DELIVERY DEVICE WITH GLYCERIN SOAP BODY AND RELATED METHODS

RELATED APPLICATIONS

This application is a continuation application of application Ser. No. 17/173,462 filed Feb. 11, 2021, which is a continuation-in-part of International Application No. PCT/US2019/04668 filed Aug. 15, 2019, which claimed priority to Provisional Application No. 62/719,229 filed Aug. 17, 2018, the entire subject matter of which is incorporated herein by reference in its entirety.

TECHNICAL FIELD

The present disclosure relates to the field of agricultural devices, and, more particularly, to disease prevention devices and related methods.

BACKGROUND

The agricultural industry is a large and robust industry worldwide. To meet worldwide demand for agricultural products, producers utilize numerous methods to maximize production in agricultural crops. For example, one technique includes removing unwanted growth (i.e., soil cultivation) around the base of crops to enhance growth and production. Typically, this is accomplished with the application of herbicide around the base of most crops.

Although there are effective herbicides, there are several drawbacks to their use. Firstly, the adaptation of herbicide resistant "super weeds" has reduced the effectiveness of many herbicides. Secondly, herbicides cannot be applied to organic fields or directly over non-GMO crops. Thirdly, the application of herbicides may weaken the crop's natural defense, and application to crops prior to harvest may result in crop damage when contacted by spray drift or when absorbed from the soil by the plant's root system.

Another technique is implementation of a robust fertilization program. Although fertilization programs do enhance growth of crops, they can be costly to implement and maintain. Moreover, herbicides cannot be applied toward organic fields or directly over non-GMO crops.

Yet another technique is a robust insecticide program. Of course, this programs provides benefits from evasive insects that harm the crop. Another benefit is the insecticide program may help prevent infection of the crop from disease, such as fungus and bacterial infections.

One example disease is citrus greening, also known as Huanglongbing (HLB) or yellow dragon disease. Citrus greening disease is one of the most serious citrus plant diseases in the world because there is currently no cure. The disease has devastated millions of acres of citrus crops throughout the United States and abroad. Citrus greening disease is spread by a disease-infected insect, the Asian citrus psyllid. The infected insect spreads the disease as it feeds on the leaves and stems of citrus trees. Citrus greening disease is further spread by moving infected plants and plant materials.

The disease has affected the entire United States citrus industry, and has been reported in 33 nations worldwide. Infected citrus trees produce fruits that are green, misshapen and bitter, unsuitable for sale as fresh fruit or for juice. Most infected trees die within a few years and have few productive years, if any.

Citrus greening disease is typically managed using insecticides to control the psyllid population. Evidence shows that reducing psyllid populations via insecticide application not only slows the rate of citrus greening disease spread but also reduces severity of the disease once established.

Young trees that produce multiple flushes throughout the year are at greater risk of greening infection than mature trees because of the attraction of adult psyllids to the new flush. Even without the disease, young trees need to be protected for about four years from psyllids and leaf miners to grow optimally. In some approaches, soil-applied systemic insecticides provide long lasting control of psyllids, but the chemicals may be environmentally harmful.

In other approaches, tree covers that enclose a tree to prevent insect infiltration are deployed. These tree cover approaches, however, may suffer from one or more drawbacks. The tree cover may rest its weight against the tree, which can damage foliage and branches of young trees. In some approaches, the tree covers may have a Skelton-like framework that prevents the cover from resting against the foliage, but the framework may provide for a more complicated install.

SUMMARY

Generally, a plant repellent delivery device assembly may include a plant with a root ball, and an integrally molded hygroscopic body comprising a hygroscopic glycerin soap base material, and an insecticide. The integrally molded hygroscopic body may have an external surface directly exposed to an external environment and configured to condense ambient moisture directly thereon. The plant repellent delivery device assembly may include at least one support structure coupled between the integrally molded hygroscopic body and a trunk of the plant. The at least one support structure may extend within the integrally molded hygroscopic body. The integrally molded hygroscopic body may be configured to release the insecticide into the root ball of the plant using the ambient moisture.

In some embodiments, the integrally molded hygroscopic body may comprise one of a sphere-shaped body and a rectangle box-shaped body. The at least one support structure may comprise a loop having a proximal end extending within the integrally molded hygroscopic body and a distal end, and a closeable connector coupled to the distal end and configured to permit the loop to be wrapped around the trunk of the plant.

In other embodiments, the at least one support structure may comprise a flexible container with an opening, and a closure configured to close the opening. The flexible container may comprise a mesh material, for example. The integrally molded hygroscopic body may comprise a hardening material or a wax material. For example, the insecticide may comprise at least one of zeta-cypermethrin, organochlorides, pyrethroids, organophosphates, neonicotinoids, ryanoids, carbamates, biologicals, natural insecticides, inorganic insecticides, and organic insecticides.

Another aspect is directed to a plant repellent delivery device comprising an integrally molded hygroscopic body comprising a hygroscopic glycerin soap base material, and an insecticide. The integrally molded hygroscopic body may have an external surface directly exposed to an external environment and configured to condense ambient moisture directly thereon. The insecticide may comprise at least one of zeta-cypermethrin, organochlorides, pyrethroids, organophosphates, neonicotinoids, ryanoids, carbamates, biologicals, natural insecticides, inorganic insecticides, and organic insecticides. The plant repellent delivery device may also include at least one support structure coupled between the integrally molded hygroscopic body and a trunk of a plant. The at least one support structure may extend within the integrally molded hygroscopic body. The integrally molded hygroscopic body may be configured to release the insecticide into a root ball of the plant using the ambient moisture.

Yet another aspect is directed to a method of using a plant repellent delivery device on a plant with a root ball. The method may include coupling the plant repellent delivery device to a trunk of the plant. The plant repellent delivery device may include an integrally molded hygroscopic body comprising a hygroscopic glycerin soap base material, and an insecticide, and at least one support structure coupled between the integrally molded hygroscopic body and the trunk of the plant. The at least one support structure may extend within the integrally molded hygroscopic body. The method may further include condensing ambient moisture directly on an external surface of the integrally molded hygroscopic body to release the insecticide into the root ball of the plant using the ambient moisture.

DETAILED DESCRIPTION

Figure 1:
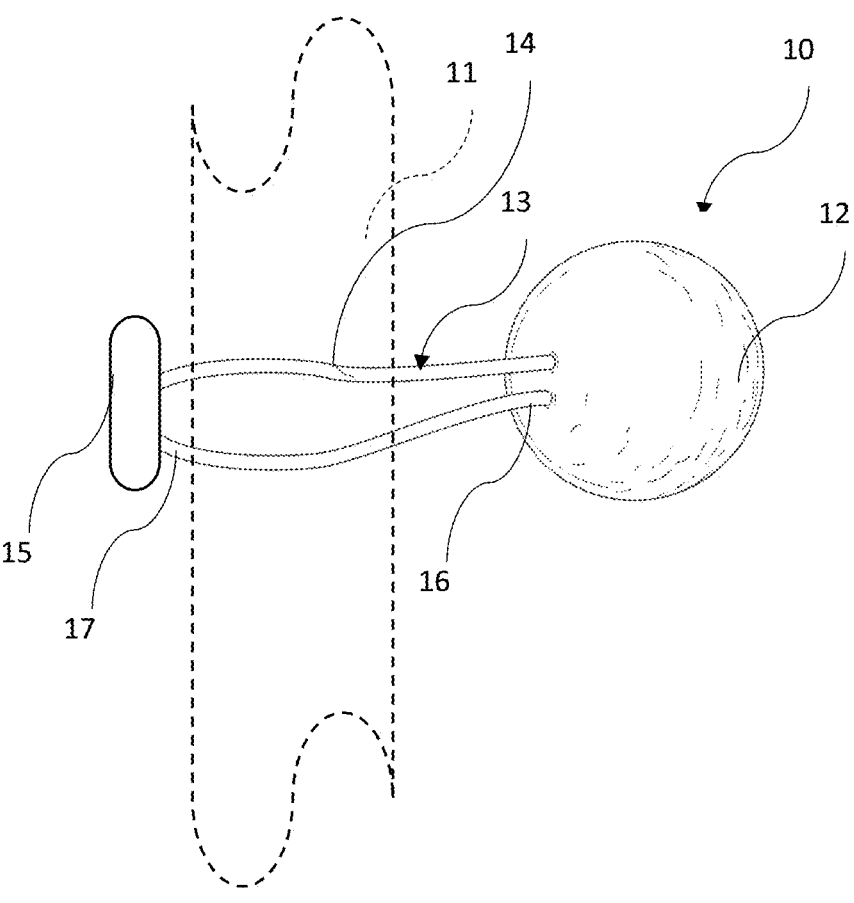
FIG. 1 is a schematic diagram of a first embodiment of a repellent delivery device coupled to a trunk of a plant, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
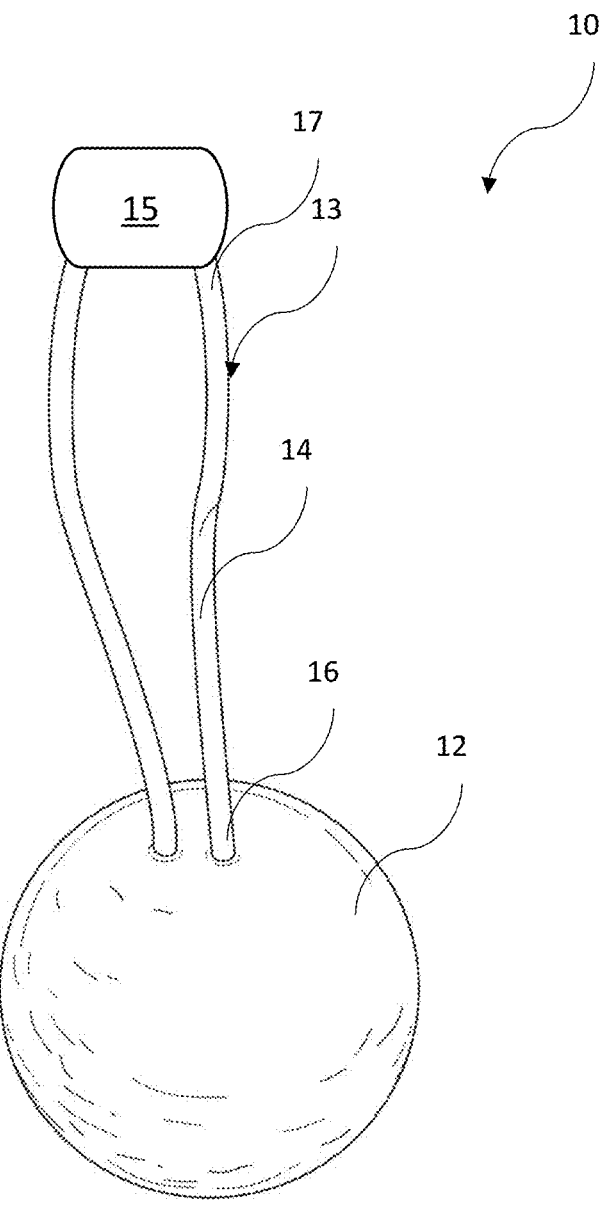
FIG. 2 is a schematic diagram of the repellent delivery device of FIG. 1.
Figure 3:
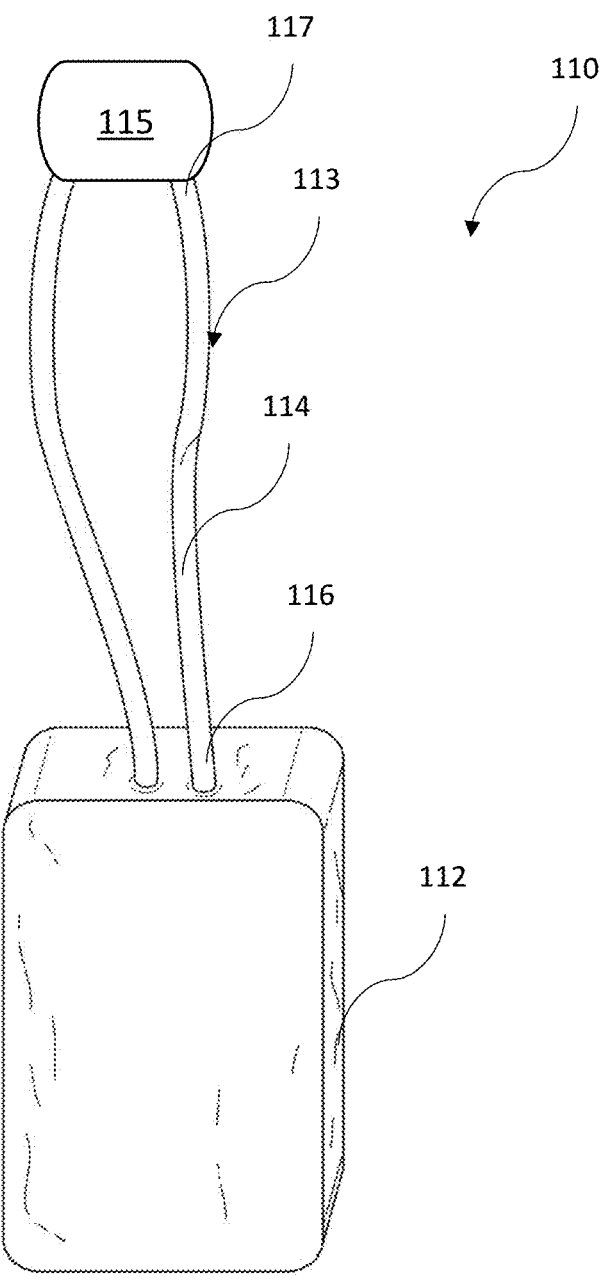
FIG. 3 is a schematic diagram of a second embodiment of the repellent delivery device, according to the present disclosure.
Figure 4:
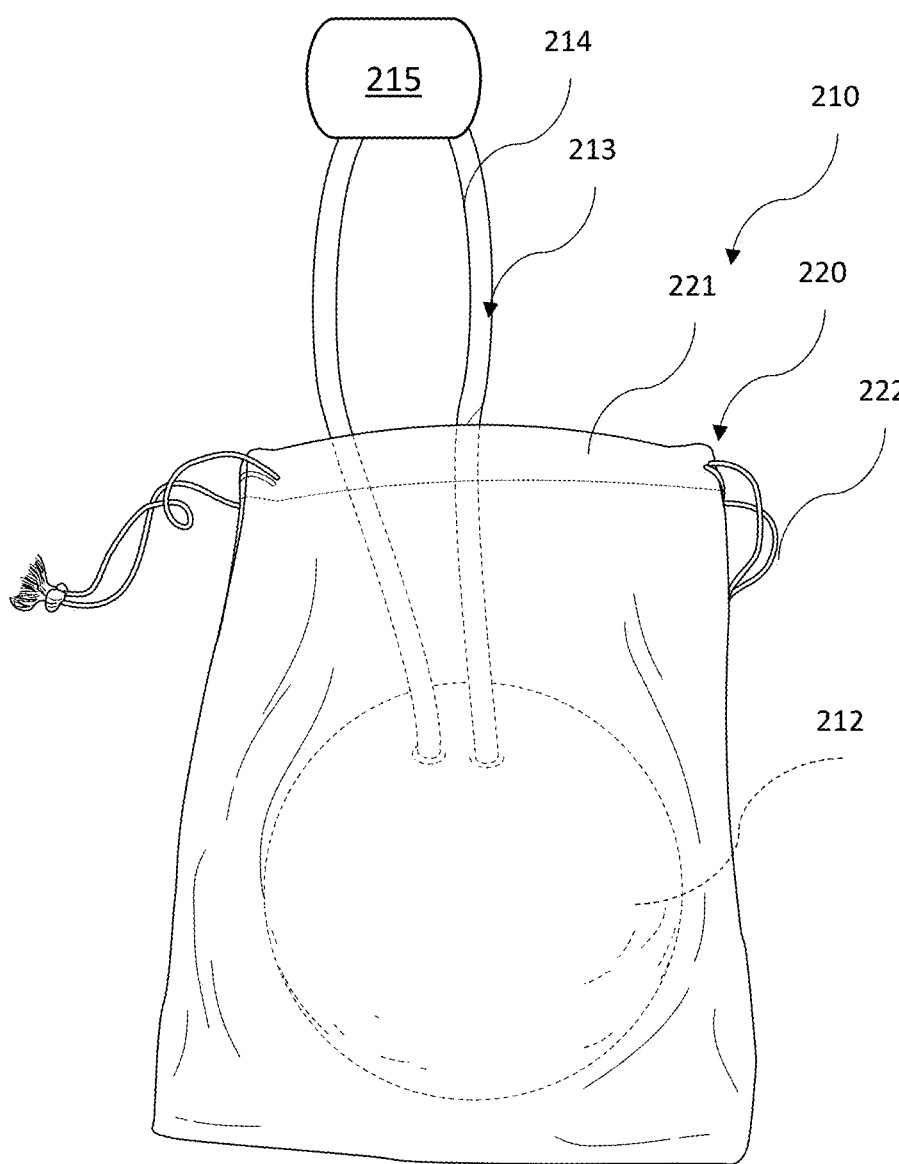
FIG. 4 is a schematic diagram of a third embodiment of the repellent delivery device, according to the present disclosure.

Referring to FIGS. 1-5, a repellent delivery device according to the present disclosure is now described. The repellent delivery device illustratively includes a body comprising a glycerin soap material. As shown, the body may comprise a rectangular box shape with rounded corners (FIGS. 3 and 5), or a sphere shape (FIGS. 1-2 & 4). Of course, these are merely exemplary, and other shapes are envisioned, such as a bar shape, a cube shape, a block shape, a stick shape, and a pellet shape. In some embodiments, the body can comprise an encapsulation layer around a trunk of the plant.

The body includes at least one insecticide, and at least one insect repellent. In particular, the glycerin soap material comprises solid glycerin. As will be appreciated, the body may be formed by first heating solid glycerin and causing it to enter a liquid state. While in the liquid state, the at least one insecticide and the at least one insect repellant are mixed into the liquid glycerin. The combined glycerin, at least one insecticide, and at least one insect repellant liquid is then formed into the desired body shape, and cooled back into a solid state.

The repellant delivery device illustratively includes a support structure coupled between the body and the trunk of a plant. The support structure may include a twisty tie, and a zip tie. In other embodiments, the support structure may comprise other physical couplings to the trunk of the plant. For example, in the embodiments of FIGS. 4-5, the support structure comprises a bag with a sting tie. The bag comprises a mesh fabric configured to permit delivery of the at least one insecticide and the at least one insect repellant therethrough.

The body is configured to slowly release the at least one insecticide and the at least one insect repellant into a root ball of the plant using ambient moisture. In other words, the ambient moisture condenses on the body and wicks the at least one insecticide and the at least one insect repellent from the body. Also, since the body is exposed to the external environment, precipitation also aids this wicking process that slowly wicking the body into the root ball of the plant.

In the following, a discussion of varying optional features for inclusion in the repellent delivery device are now described.

1) Glycerol, also known as glycerin, is a hygroscopic, colorless, odorless, simple polyol compound derived from animals or plants. Glycerol is currently used in many products, especially in the food and pharmaceutical industries. Glycerin can be synthesized, but this is expensive.

2) The method being described includes a glycerol base that is used as a dispersal system for an active ingredient.

3) The glycerol base can be in many forms such as balls, bars, cubes, blocks, sticks, pellets, mats, and liquid encapsulation.

4) This product can be deployed in many different forms, such as various connective methods, for example, strings, hooks, plastic loops, and the like which can also be embedded in the product either during or after manufacturing.

5) The product can be deployed using many different methods or containers, such as stakes, mesh bags, cups or other like containers.

6) Product can also be in pellet or encapsulated form for broadcast applications on the ground, in the water, or from the air.

7) Product can also be warmed to a liquid state and sprayed or applied to a target where it will remain after cooling.

8) The glycerin can also be used as a solvent for extracting liquid from herbs or plants which forms glycerites.

9) Glycerin is a known preservative of active ingredients such as botanical oils and extracts. This is key to this delivery method as it will extend the duration for which the active ingredients will be effective.

10) The hygroscopic nature of glycerin will enhance the dispersal of the active ingredient as it will continue drawing moisture to the product. This will keep it fresh and prevent drying out.

11) This method can be used to disperse many different repellents against many different targets such as birds, mammals, insects, or other pests. The active ingredient can be natural or synthesized.

12) One drawback to using botanical extracts or oils as repellents is they breakdown and lose their effectiveness very quickly. The preservative nature of the glycerin will extend the effectiveness and useful duration of the active ingredients.

13) Product can also be used as a bait and kill method by adding an attractant in combination with a pesticide. A specific color can also be used as the attractant portion of this method.

14) Product can also be used as a method for dispersal of live biological agents such as bacteria, fungus, viruses, or eggs.

15) Product can also be used for dispersal of fertilizers, growth hormones, fungicides, anti-viral agents or the like.

16) Product can be used as an attractant for many different targets such as animals, reptiles, fish, insects, or the like.

17) Attractants can be of urine, pheromone, oils, blood, food scents, or the like.

18) Product can also be in multiple pieces connected by some fashion, such as a string, wire, plastic, or in a net form.

19) Product can be used in a container similar to the way stick deodorant is used or in a closed container in the form of a salve.

20) Different compounds, such as wax or hardeners, can be added to the product to inhibit degradation or increase longevity. Likewise, compounds can be added to the product to increase the rate of breakdown or increase the dispersal rate.

21) This product can be used to combat many of the world's most destructive pests, such as the citrus psyllid, mosquitoes, spotted wing *drosophila*, birds, and many other of the like.

A device for field release of volatile repellents against Asian citrus psyllid (ACP), *Diaphorina citri* is disclosed herein. Several known plant-derived, on-host volatiles are known to affect ACP behavior by reducing host acceptance by this insect when deployed on or around citrus. An effective release device for such potentially useful repellants is necessary in order for such chemicals to be potentially useful for direct management of this pest. Repellent formulations have been shown to reduce ACP populations in citrus over short durations. An effective release device that places these repellents into the grove atmosphere for prolonged periods may serve as a new tool for reducing populations of this pathogen vector and thus help improve HLB management. Effective repellent formulations may serve as useful replacements or supplements for sprays of broad-spectrum insecticides, reducing the selection pressure for development of insecticide resistance and reducing impact of indiscriminate insecticide sprays on populations of ACP natural enemies. Formulation and deployment strategies of repellents may reduce ACP populations in commercial groves and the spread of the HLB pathogen when integrated into a comprehensive HLB management program.

BACKGROUND

One of the purposes of this present disclosure is to develop and document a field management strategy that significantly reduces both the infestation rates of ACP and necessity of broad spectrum insecticide application. HLB has spread rapidly throughout citrus groves in Florida since its initial discovery in 2005, in large part due to the highly mobile nature of adult ACP, its primary vector. Because ACP is the key driver of disease spread, much effort has been spent on developing control tactics for the vector.

The majority of ACP management programs rely heavily on the use of insecticides, applications of which are timed to coincide with periods when researchers expect the greatest mortality of ACP nymphs and/or adults. Control of ACP in Florida can require up to 12 insecticidal applications per year (Qureshi et al., 2014), which is not a viable long-term management option. Due to a combination of factors including heavy chemical management, several insecticide-resistant ACP populations have been documented in Florida (Tiwari et al. 2011, Kanga et al. 2016, Chen and Stelinski 2017). Growers need more tools at hand to enable them to adopt financially and environmentally sustainable management options.

One such option may be use of repellents to reduce ACP colonization of citrus plants. Previous research has yielded promising results for the use of olfactory repellents for ACP in laboratory, and even field settings to a limited extent (Mann et al. 2011, 2012, Onagbola et al. 2011, Kuhns et al. 2016, Hall et al. 2018, Seo et al. 2018). Despite these promising results, successful long-term implementation in a field setting has not yet been achieved as previously tested delivery mechanisms were found to be sub-optimal in terms of both repellant delivery duration (Onagbola et al. 2011) and cost ($17/device or $136/tree) (Kuhns et al. 2016).

For a repellant device to be integrated into a management program, it needs to be practical in terms of duration, cost, and efficacy in reducing ACP populations or impeding ACP colonization of commercial citrus trees. Also, a requirement of a practical repellent release device would be year-round efficacy against ACP given their year-round activity, with peak movement during spring and summer (Hall and Hentz 2011, Lewi-Rosenblum et al. 2015).

The repellant delivery device disclosed herein may be capable of achieving the above-described goals. All repellents were chosen based on a review of relevant literature by this team. Based on their promising preliminary results, Applicant believes that this device holds potential as a useful tool for management of ACP. In visiting a reset field in late June where these repellent delivery devices had been deployed 5 weeks previously, (random deployment of 4 potential repellent odors at the field edge), Applicant scouted for ACP and was unable to find eggs, nymphs, or adults until the 8th row into the test field from the edge and found only low number of ACP present. In a neighboring control block, infestation was apparent in all rows. Applicant visited again at 7 weeks post-device deployment and found a total of 7 ACP nymphs in the 5th row of trees from the edge with consistent infestation in the control field.

Potential Testing

All potential repellants will be tested in a series of semi-controlled settling assays in outdoor cages (2 m$^3$; Bioquip Cat No. 1406B) at the Citrus Research and Education Center in Lake Alfred, Florida. Caged pots with similar-aged flush will be used in combination with the delivery devices, which have been impregnated with odors of interest.

Using a combination of research groves (2-3 locations), which will receive no additional insecticidal inputs for psyllid management, and 2 grower sites, which will receive chemical management upon grower discretion, Applicant will determine the distance of repellence (number of rows from device deployment), and the duration for which these repellents are effective. Based on previous observations, Applicant plans to replace devices every 5 weeks, which will both enable deployment of fresh repellent and rotation of odors from plot to plot. If devices show strong repellency at 5 weeks, this anticipated time frame will be adjusted to enable capture of full duration of efficacy. These tests will be performed in a randomized complete block design, ideally with one side of the plot design comprising a field edge because ACP are known to colonize grove edges at highest population densities.

Applicant will determine the best manner in which to deploy repellent delivery devices for use in commercial groves. Anticipated field deployment strategies include (1) edge-only deployment whereby 2-3 edge rows will receive devices, (2) every-tree deployment, where each tree received one device, (3) clumped pockets, where pockets of 4-8 neighboring trees receive devices and these clumps are spread throughout a grove, (4) every-other-row deployment, (5) no device negative control, and (6) pyrethroid insecticide (zeta-cypermethrin at 4.9 oz/acre) spray as a grower standard positive control. Applicant will test these designs in both young and mature groves.

Using the disclosed release device for ACP repellent deployment, Applicant will develop recommendations for using this new tool based on replicated and carefully conducted experiments with appropriate controls. Applicant expects that this repellent device will provide a low-cost option for growers to reduce reliance on frequent application of insecticides for ACP management. This can reduce the likelihood of the development and/or further increase of insecticide resistant populations and move ACP management towards a long-term integrated pest management framework.

Referring now to FIGS. 1-2, a repellent delivery device 10 according to the present disclosure is now described. As will be appreciated, the repellent delivery device 10 is to be coupled to a trunk 11 of a plant. It should be appreciated that the repellent delivery device 10 could also be coupled to fences, perimeter posts, plant stakes, etc. The repellent delivery device 10 illustratively comprises a body 12 comprising a hygroscopic base material, and at least one of an insecticide, and an insect repellant. The body 12 may also include other biological agents and fungicides. For example, the body 12 may include an insect mating disruption chemical. In some embodiments, the insect repellant is replaced with an insect chemical attractant.

The repellent delivery device 10 illustratively comprises a support structure 13 coupled between the body 12 and the trunk 11 of the plant. The body 12 is configured to release the at least one of the insecticide and the insect repellant into a root ball of the plant using ambient moisture.

As will be appreciated, when the body 12 is exposed to a humid environment, the body will attract and condense moisture thereon from the atmosphere. The hygroscopic nature of the body 12 will cause it to dissolve in the condensed moisture, and via gravity, the dissolved insecticide and insect repellant will be drawn down into the root ball of the tree.

In some embodiments, the hygroscopic base material may comprise a glycerin soap material. The hygroscopic base material may comprise other non-hygroscopic materials for enhancing the durability of the body 12. The hygroscopic base material may additionally or alternatively comprise one or more of cellulose fibers (e.g., cotton and paper), sugar, caramel, honey, glycerol, ethanol, wood, methanol, sulfuric acid, fertilizer materials, salts (e.g., calcium chloride, bases like sodium hydroxide etc.). For example, the fertilizer materials may comprise urea peroxide (i.e., urea hydrogen peroxide or $CH_6N_2O_3$), and/or one or more additional fertilizer agents. Helpfully, the body 12 is also configured to release the fertilizer materials into a root ball of the plant using the ambient moisture.

The body 12 illustratively includes a sphere-shaped body. Of course, this shape is exemplary and other shapes are possible, such as the rectangle box-shaped body of the embodiments of FIGS. 3 & 5, an oval-shaped body, or a cube-shaped body.

In some embodiments, the support structure 13 is omitted to provide for a smaller form-factor. For example, the body 12 may be pellet-shaped for insertion into drip drains to prevent accumulation of organic growth with fungicides.

The insecticide may include one or more of zeta-cypermethrin, organochlorides, pyrethroids, organophosphates, neonicotinoids, ryanoids, carbamates, biologicals, natural insecticides (e.g., such as nicotine, pyrethrum, & and neem extracts), inorganic insecticides, and organic insecticides (e.g., Allethrin Bifenthrin, Cyhalothrin, Lambda-cyhalothrin Cyfluthrin, Deltamethrin, Etofenprox, Fenvalerate, Permethrin, Phenothrin, Prallethrin, Resmethrin, Tetramethrin, Tralomethrin, & Transfluthrin), for example. The insect repellent may comprise one or more of an olfactory repellant, methyl anthranilate and other anthranilate-based insect repellents, benzaldehyde, DEET (N, N-diethyl-m-toluamide), dimethyl carbate, dimethyl phthalate, icaridin, butopyronoxyl, ethyl butylacetylaminopropionate, metofluthrin, permethrin, SS220 ((1S,2'S)-Methylpiperidinyl-3-cyclohexen-1-carboxamide), tricyclodecenyl allyl ether, beautyberry (Callicarpa) leaves, bog myrtle (Myrica Gale), catnip oil whose active compound is nepetalactone, citronella oil, essential oil of the lemon *eucalyptus* (*Corymbia citriodora*) and its active compound p-menthane-3,8-diol (PMD), neem oil, lemongrass, tea tree oil from the leaves of *Melaleuca alternifolia*, and tobacco.

More specifically, the support structure 13 illustratively comprises a loop 14. The loop 14 illustratively includes having a proximal end 16 coupled to the body 12 and a distal end 17. The support structure 13 illustratively includes a closeable connector 15 coupled to the distal end 17 of the loop 14 and configured to permit the loop to be wrapped around the trunk 11 of the plant.

In some embodiments the support structure 13 comprises a cable tie fastener. In these embodiments, the loop 14 comprises the flexible tape section, and the closeable connector 15 comprises the pawl in a head section for receiving the flexible tape section. In other embodiments, the support structure 13 comprises a twist tie device, a wire-based hook device, or a generic fastener.

Figure 7:
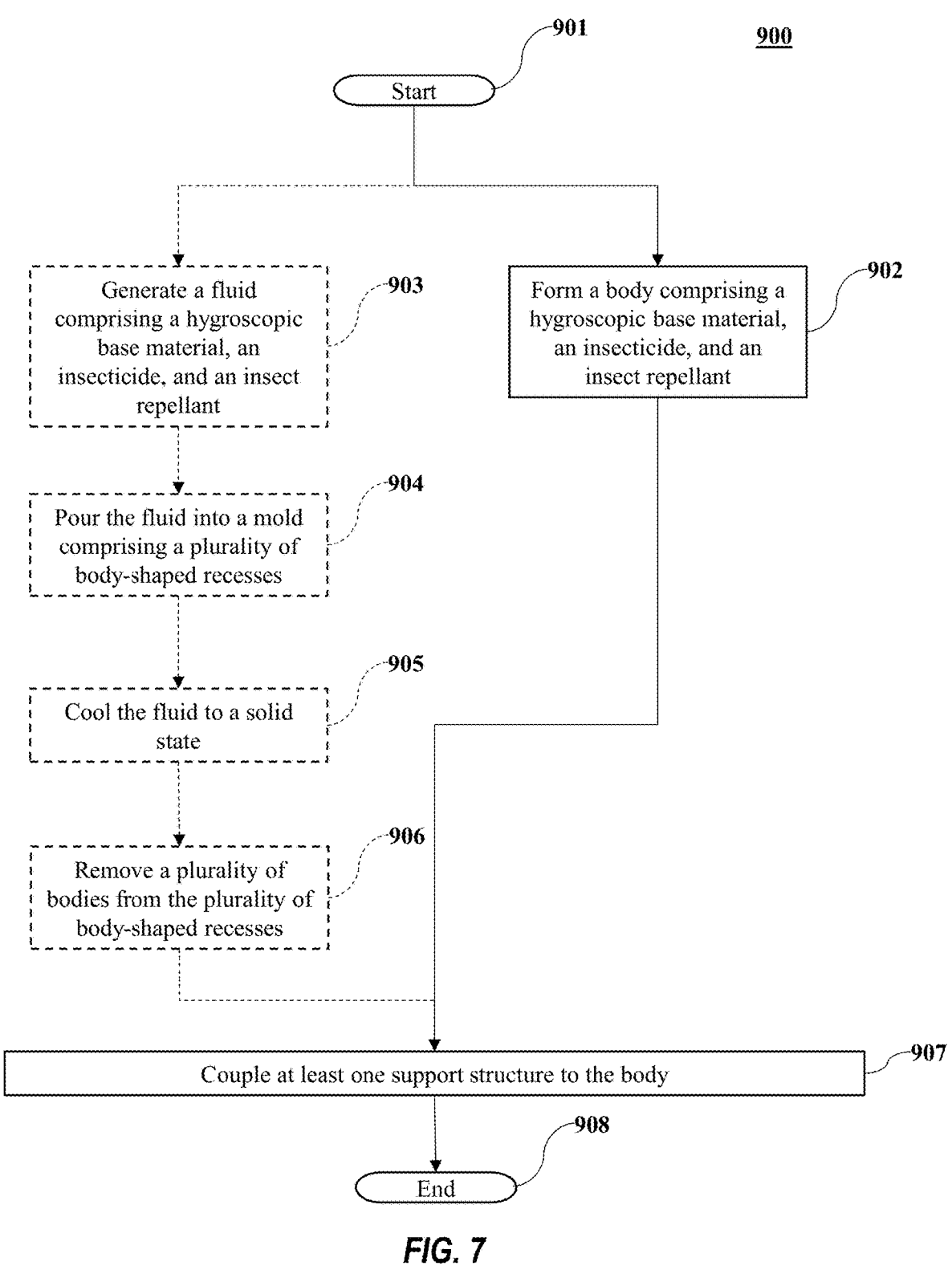
FIG. 7 is a flowchart for a method for making the repellent delivery device, according to the present disclosure.

Referring now to FIG. 7 and a flowchart 900 therein, a method for making the repellent delivery device 10 is now described, which starts at Block 901. The method comprises forming a body 12 comprising a hygroscopic base material, and at least one of an insecticide, and an insect repellant at Block 902. The method illustratively comprises coupling at least one support structure 13 to the body 12 at Block 907. The at least one support structure 13 is to be coupled to a trunk 11 of a plant. The body 12 is configured to release the at least one of the insecticide and the insect repellant into a root ball of the plant using ambient moisture.

In some embodiments, the step of forming the body 12 comprises generating a fluid comprising the hygroscopic base material, and the at least one of the insecticide, and the insect repellant at Block 903. The method includes pouring the fluid into a mold comprising a plurality of body-shaped recesses at Block 904, cooling the fluid to a solid state at Block 905, and removing a plurality of bodies 12 from the plurality of body-shaped recesses at Block 906. Of course, since these steps are exemplary and indicative of potential method for forming a large number of the repellent delivery devices 10, these steps are shown as dashed. The method ends at Block 908.

Referring now additionally to FIG. 3, another embodiment of the repellent delivery device 110 is now described. In this embodiment of the repellent delivery device 110, those elements already discussed above with respect to FIGS. 1-2 are incremented by 100 and most require no further discussion herein. This embodiment differs from the previous embodiment in that this repellent delivery device 110 illustratively includes the body 112 with a rectangle box-shaped body. The repellent delivery device 110 illustratively comprises a support structure 113 coupled between the body 112 and the trunk (not shown) of the plant. The body 112 is configured to release the at least one of the insecticide and the insect repellant into a root ball of the plant using ambient moisture.

More specifically, the support structure 113 illustratively comprises a loop 114. The loop 114 illustratively includes having a proximal end 116 coupled to the body 112 and a distal end 117. The support structure 113 illustratively includes a closeable connector 115 coupled to the distal end 117 of the loop 114 and configured to permit the loop to be wrapped around the trunk of the plant.

Referring now additionally to FIG. 4, another embodiment of the repellent delivery device 210 is now described. In this embodiment of the repellent delivery device 210, those elements already discussed above with respect to FIGS. 1-2 are incremented by 200 and most require no further discussion herein. This embodiment differs from the previous embodiment in that this repellent delivery device 210 illustratively includes an additional support structure comprising a flexible container 220 with an opening 221, and a closure strap 222 configured to close the opening. In some embodiments, the flexible container 220 comprises a mesh material. The repellent delivery device 210 illustratively comprises a support structure 213 coupled between the body 212 and the trunk (not shown) of the plant. The body 212 is configured to release the at least one of the insecticide and the insect repellant into a root ball of the plant using ambient moisture. More specifically, the support structure 213 illustratively comprises a loop 214, and a closeable connector 215 coupled to the distal end of the loop and configured to permit the loop to be wrapped around the trunk of the plant.

Although in the illustrated embodiment, the repellent delivery device 210 comprises an additional support structure, in some applications, the flexible container 220 is the only support structure and the loop 214 and closeable connector 215 are omitted (i.e., the support structure comprises the flexible container 220). In these embodiments, the closure strap 222 is configured to also attach to the trunk of the plant (e.g., the illustrated closure strap is tied to the trunk of the plant).

Figure 5:
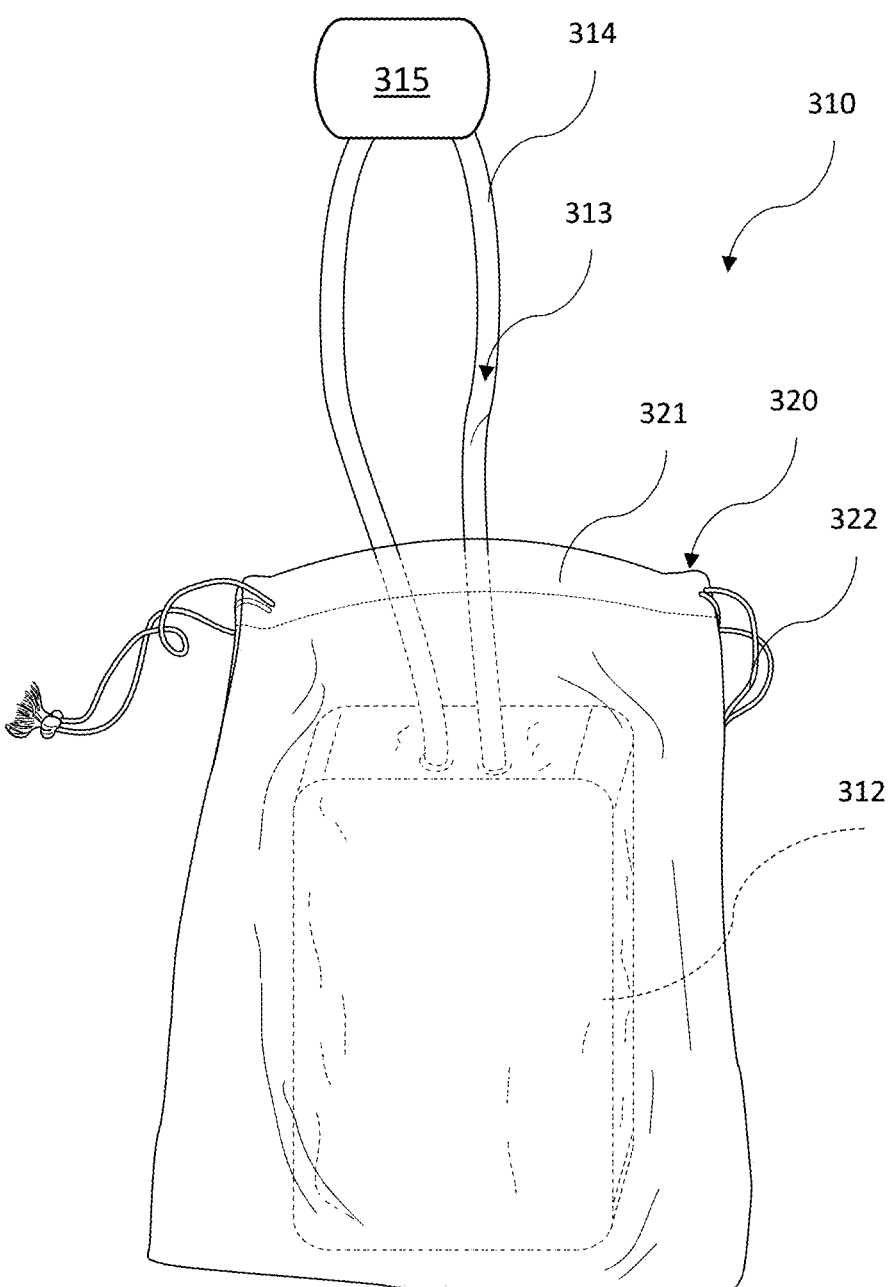
FIG. 5 is a schematic diagram of a fourth embodiment of the repellent delivery device, according to the present disclosure.

Referring now additionally to FIG. 5, another embodiment of the repellent delivery device 310 is now described. In this embodiment of the repellent delivery device 310, those elements already discussed above with respect to FIGS. 1-2 are incremented by 300 and most require no further discussion herein. This embodiment differs from the previous embodiment in that this repellent delivery device 310 illustratively includes an additional support structure comprising a flexible container 320 with an opening 321, and a closure strap 322 configured to close the opening. In some embodiments, the flexible container 320 comprises a mesh material. This repellent delivery device 310 also illustratively includes the body 312 with a rectangle box-shaped body.

The repellent delivery device 310 illustratively comprises a support structure 313 coupled between the body 312 and the trunk (not shown) of the plant. Although in the illustrated embodiment, the repellent delivery device 310 comprises an additional support structure, in some applications, the flexible container 320 is the only support structure and the loop 314 and closeable connector 315 are omitted (i.e., the support structure comprises the flexible container 320). In these embodiments, the closure strap 322 is configured to also attach to the trunk of the plant (e.g., the illustrated closure strap is tied to the trunk of the plant).

Figure 6:
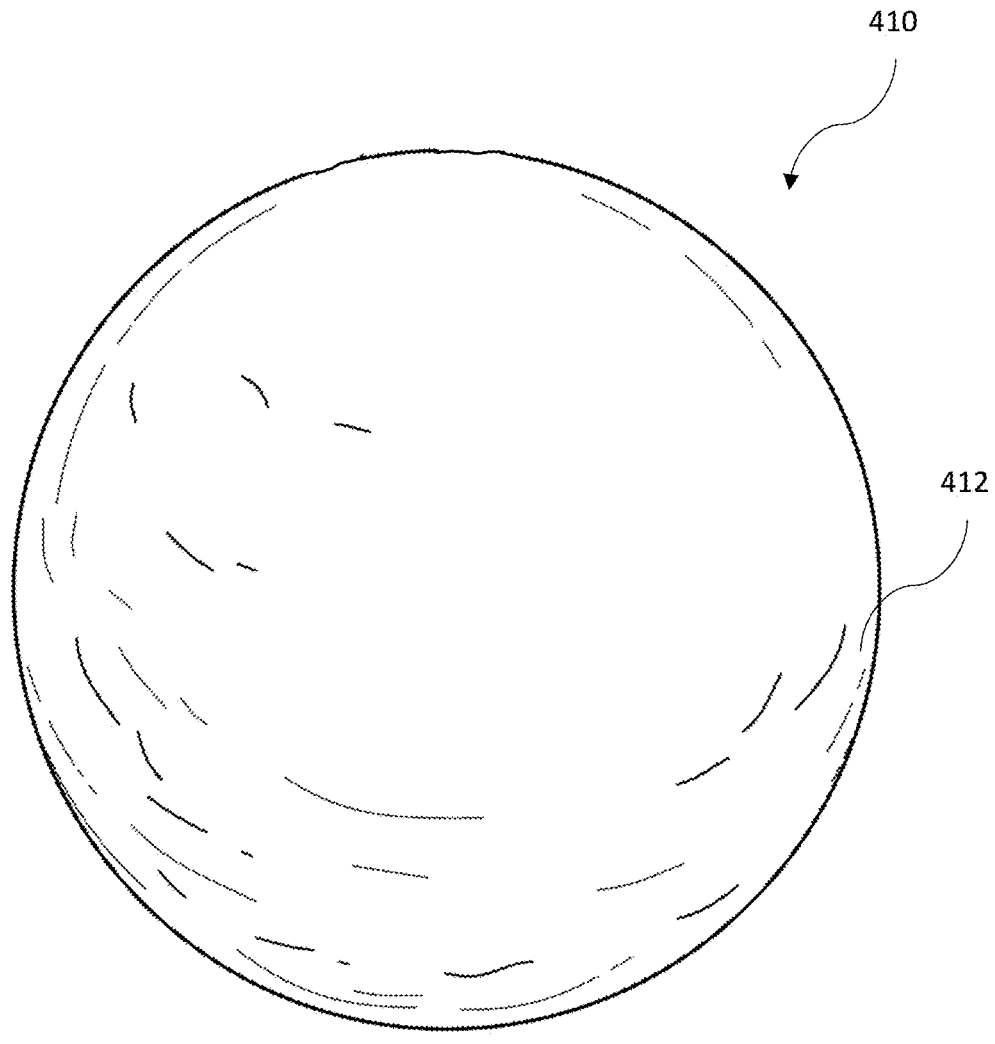
FIG. 6 is a schematic diagram of a fifth embodiment of the delivery device, according to the present disclosure.

Referring now additionally to FIG. 6, another embodiment of the repellent delivery device 410 is now described. In this embodiment of the repellent delivery device 410, those elements already discussed above with respect to FIGS. 1-2 are incremented by 400 and most require no further discussion herein. This embodiment differs from the previous embodiment in that this repellent delivery device 310 illustratively omits the support structure. The body 412 is illustratively pellet-shaped. Here, the body 412 is sized to fit into drain lines of air conditioning units, heat pump water heaters, or for any general-purpose low volume drain line. The body 412 would include at least one of a fungicide, an algaecide, and an insecticide. Due to the low fluid volume in the drain line, the body 412 will deposit the at least one of the fungicide, the algaecides, and the insecticide in the drain line.

In some embodiments, the support structure may comprise one or more feet extending outward from the body 412 to prevent the pellet from rolling down the drainpipe. In other words, the body 412 needs to remain in the upper portion of the drain line to be effective.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A citrus plant repellent delivery device assembly comprising:
   a citrus plant with a root ball;
   an integrally molded hygroscopic body comprising a hygroscopic glycerin soap base material, and an insecticide, the integrally molded hygroscopic body having an external surface directly exposed to an external environment and configured to condense ambient moisture directly thereon; and
   at least one support structure coupled between the integrally molded hygroscopic body and a trunk of the citrus plant, the at least one support structure extending within the integrally molded hygroscopic body;
   the integrally molded hygroscopic body configured to release the insecticide into the root ball of the citrus plant using the ambient moisture.

2. The citrus plant repellent delivery device assembly of claim 1 wherein the at least one support structure comprises a flexible container with an opening, and a closure configured to close the opening.

3. The citrus plant repellent delivery device assembly of claim 2 wherein the flexible container comprises a mesh material.

4. The citrus plant repellent delivery device assembly of claim 1 wherein the integrally molded hygroscopic body comprises a sphere-shaped body.

5. The citrus plant repellent delivery device assembly of claim 1 wherein the integrally molded hygroscopic body comprises a rectangle box-shaped body.

6. The citrus plant repellent delivery device assembly of claim 1 wherein the at least one support structure comprises a loop having a proximal end extending within the integrally molded hygroscopic body and a distal end, and a closeable connector coupled to the distal end and configured to permit the loop to be wrapped around the trunk of the citrus plant.

7. The citrus plant repellent delivery device assembly of claim 1 wherein the integrally molded hygroscopic body comprises a hardening material.

8. The citrus plant repellent delivery device assembly of claim 1 wherein the integrally molded hygroscopic body comprises a wax material.

9. The citrus plant repellent delivery device assembly of claim 1 wherein the insecticide comprises at least one of zeta-cypermethrin, organochlorides, pyrethroids, organo-phosphates, neonicotinoids, ryanoids, carbamates, biologicals, natural insecticides, inorganic insecticides, and organic insecticides.

10. A citrus plant repellent delivery device comprising:

an integrally molded hygroscopic body comprising a hygroscopic glycerin soap base material, and an insecticide, the integrally molded hygroscopic body having an external surface directly exposed to an external environment and configured to condense ambient moisture directly thereon, the insecticide comprising at least one of zeta-cypermethrin, organochlorides, pyrethroids, organophosphates, neonicotinoids, ryanoids, carbamates, biologicals, natural insecticides, inorganic insecticides, and organic insecticides; and at least one support structure coupled between the integrally molded hygroscopic body and a trunk of a citrus plant, the at least one support structure extending within the integrally molded hygroscopic body;

the integrally molded hygroscopic body configured to release the insecticide into a root ball of the citrus plant using the ambient moisture.

11. The citrus plant repellent delivery device of claim 10 wherein the at least one support structure comprises a flexible container with an opening, and a closure configured to close the opening.

12. The citrus plant repellent delivery device of claim 11 wherein the flexible container comprises a mesh material.

13. The citrus plant repellent delivery device of claim 10 wherein the integrally molded hygroscopic body comprises a sphere-shaped body.

14. The citrus plant repellent delivery device of claim 10 wherein the integrally molded hygroscopic body comprises a rectangle box-shaped body.

15. The citrus plant repellent delivery device of claim 10 wherein the at least one support structure comprises a loop having a proximal end extending within the integrally molded hygroscopic body and a distal end, and a closeable connector coupled to the distal end and configured to permit the loop to be wrapped around the trunk of the citrus plant.

16. The citrus plant repellent delivery device of claim 10 wherein the integrally molded hygroscopic body comprises a hardening material.

17. The citrus plant repellent delivery device of claim 10 wherein the integrally molded hygroscopic body comprises a wax material.

18. A method of using a citrus plant repellent delivery device on a citrus plant with a root ball, the method comprising:

coupling the citrus plant repellent delivery device to a trunk of the citrus plant, the citrus plant repellent delivery device comprising an integrally molded hygroscopic body comprising a hygroscopic glycerin soap base material, and an insecticide, and at least one support structure coupled between the integrally molded hygroscopic body and the trunk of the citrus plant, the at least one support structure extending within the integrally molded hygroscopic body; and condensing ambient moisture directly on an external surface of the integrally molded hygroscopic body to release the insecticide into the root ball of the citrus plant using the ambient moisture.

19. The method of claim 18 wherein the integrally molded hygroscopic body comprises one of a sphere-shaped body and a rectangle box-shaped body.

20. The method of claim 18 wherein the at least one support structure comprises a loop having a proximal end extending within the integrally molded hygroscopic body and a distal end, and a closeable connector coupled to the distal end and configured to permit the loop to be wrapped around the trunk of the citrus plant.

\* \* \* \* \*